T. F. GRIFFITHS.
Hold-Back.

No. 36,347.

Patented Sept. 2, 1862.

Witnesses:
Iso E Loughborough

Inventor:
T F Griffiths
Per Wm S Loughborough

UNITED STATES PATENT OFFICE.

THOMAS F. GRIFFITHS, OF DANSVILLE, NEW YORK.

IMPROVED HOLDBACK FOR CARRIAGES.

Specification forming part of Letters Patent No. 36,347, dated September 2, 1862.

*To all whom it may concern:*

Be it known that I, THOMAS F. GRIFFITHS, of Dansville, in the county of Livingston and State of New York, have invented a new and useful Improvement in Holdback Hooks and Clasps for Buggies and other Single-Horse Vehicles; and I do hereby declare that the following is a full, clear, and exact description thereof, reference being had to the annexed drawings, making a part of this specification, in which—

Figure 1:
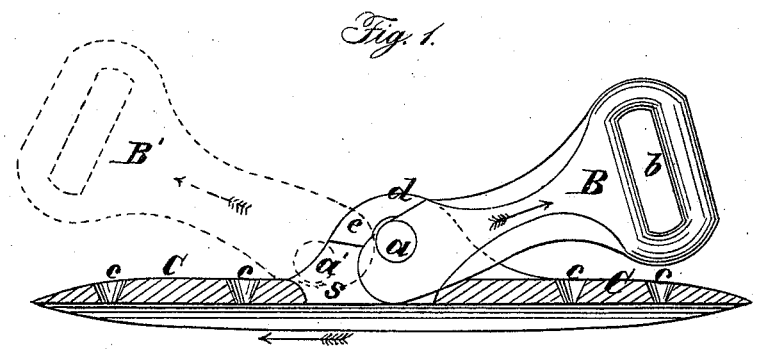
Figure 2:
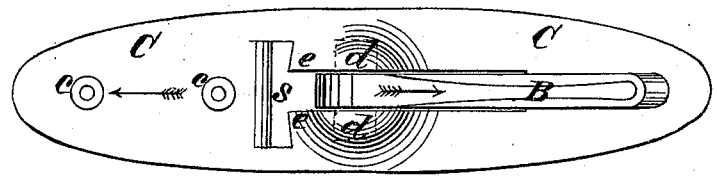

Figure 1 is a vertical section of the clasp C, and showing a side elevation of the hook B. Fig. 2 is a top view of the invention.

Similar letters of reference indicate corresponding parts in both figures, and the arrows indicate the direction of the draft of each part.

This invention consists in the construction of a simple and efficient holdback hook and clasp for buggies, &c., which locks without a spring, and is made so as to unhook automatically in case the whiffletree should be broken or the tugs broken or unhitched, and thus entirely release the horse from the vehicle.

To enable others to make and use my invention, I will proceed to describe its construction and operation.

The under side of the clasp C is made slightly concave to fit the thill, to the top of which it is fixed by screws passing through the several countersunk holes, c. It is pierced centrally by a slot or mortise, s, to receive the body of the hook B. There is a raised ear, d, on each side of the mortise, and they are recessed out to receive the lugs or projections a on each side of the body of the hook. These recessed chambers are sufficiently open at their base in front to admit of the passage of the lugs a when the hook B is placed in the position indicated by the dotted lines at B' in Fig. 1. The hook B is cast with the slot b, through which the holdback-strap is buckled, and to which it remains attached. The lugs a are placed at one edge of the hook B, as seen in Fig. 1, and the other edge, when the hook is adjusted, rests upon the thill, whereby the guards or points e effectually prevent the detachment of the hook while in that position. There may be a thin plate of rubber secured between the hook B and the thill, which would prevent any rattle by keeping the lugs a pressed against the upper side of the recess in the ears d.

The parts may be made of malleable iron.

Operation: The hook B is placed in the position of the dotted lines at B' in Fig. 1, which brings the lugs a below the guards e, as shown at a', when it may be slipped in, and when turned back to its present position the eccentric circular end of the hook bearing against the thill throws the lugs a up behind the guards e, which effectually prevents it from becoming detached, except in case the whiffletree should be broken or the tugs broken or unhooked, in either of which cases, the horse being allowed to move forward in the thills, the holdback-straps would swing the hooks over into the position of B', and as the inner face of the guards e is made sloping the lugs are effectually relieved and the horse becomes entirely freed from the vehicle.

This is a very simple, cheap, and durable device, there being no springs to break or get out of order, and yet it is susceptible of an automatic detachment in case of accidents of the nature above mentioned.

I claim—

The employment or use of the clasp C and the hook B, they being constructed substantially in the manner specified and operating conjointly for the purposes set forth.

T. F. GRIFFITHS.

Witnesses:
C. W. LEONARD,
C. SEATEN.